March 3, 1970     B. C. DOWNING     3,498,575

DROP-WIRE SUPPORT

Filed July 30, 1968

INVENTOR.
B. C. DOWNING
BY
*V. F. Volk*
HIS AGENT

United States Patent Office 3,498,575
Patented Mar. 3, 1970

3,498,575
DROP-WIRE SUPPORT
Billy C. Downing, Bowie, Md., assignor to Anaconda Wire and Cable Company, a corporation of Delaware
Filed July 30, 1968, Ser. No. 748,748
Int. Cl. F16l 3/02, 15/00, 3/08
U.S. Cl. 248—71                    4 Claims

ABSTRACT OF THE DISCLOSURE

A molded plastic drop-wire support can be screwed to a wall from either side and will hold the wire in a snap fit before the screw is finally tightened after which integral ridges secure the wire against lengthwise movement.

BACKGROUND OF THE INVENTION

Although wire supports have been made in great variety for many years, I have recently found upon seeking a support for fastening drop-wires to the sides of buildings and the like, that none of the available supports are entirely satisfactory. The known supports are frequently too costly, and many are made of metal which, in addition to being electrically conducting, may, through eventual corrosion, have a staining effect on wall surfaces. Most available supports must be assembled to some extent at the installation site, which is slow and costly, and offer inadequate gripping of the wire against lengthwise movement. Many supports, in addition, are bulky and unsightly, so that they deface the appearance of buildings to which they have been attached.

SUMMARY

I have now invented a support with the objectives of:
Providing a symmetrical form so that a screw or other fastening means can be inserted through either side;
Providing adequate rigidity combined with low weight and cost;
Providing a temporary support for a wire during installation;
Providing means for removing the supported wire without detaching the support;
Providing a positive grip against lengthwise wire movement;
Providing a support that will not stain the supporting surface;
Providing a support with good dielectric properties;
Providing a support at extremely low unit cost and low cost of installation.

To achieve the above-listed objectives, my drop-wire support comprises an integral polymeric clamping member comprising a pair of equivalent facing plate-like leg members, having thin-walled portions that cooperate to define a channel that closely fits the drop wire. The leg members also have solid thick-walled portions that cooperate to define a narrow slot coextensive with the channel and join in integral bridging means, with the slot extending from the bridging means to the channel. The clamping member also comprises inwardly facing lips forming an end of the channel opposite the slots and defining a lengthwise entrance to the channel that is narrower than the drop wire. A plurality of gripping ridges project inwardly of the channel from the leg members across the lengthwise dimension of the drop wire, and stiffening walls project outwardly around the edges. A bore is formed through the thick-walled portions of the leg members and an elongated fastening means projects through the bore. This fastening means is sufficiently long to attach the clamping member to a supporting surface and it compresses the slot to tighten the clamping member around the drop wire thereby impressing the gripping ridges into the surface and securing the wire against lengthwise movement. The drop wire has a snap fit laterally into the clamping member by spreading the slot without necessarily removing the fastening means, prior to tightening it. When the fastening means is tightened the drop wire is securely locked in. I prefer nylon or ABS (acrylonitrile butadiene styrene) as the polymeric material of my clamping means, and I prefer my support to comprise at least one integral membrane across the bore to retain the fastening means within the bore frictionally before the support is installed.

DESCRIPTION OF THE PREFERRED EMBODIMENT

Figure 1:
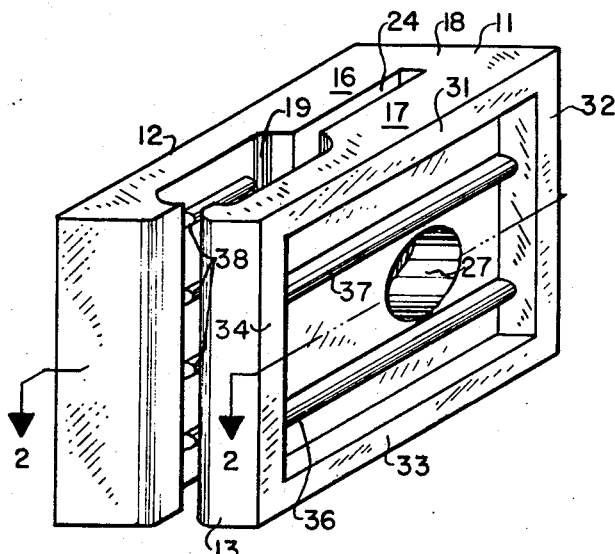
FIGURE 1 shows a pictorial view of our support.
Figure 2:
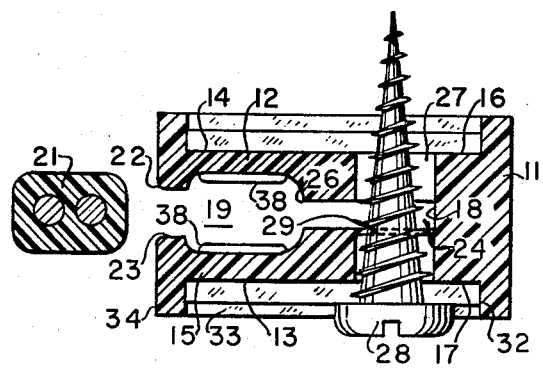
FIGURE 2 shows a section through the lines 2—2 of FIGURE 1.

A clamping member 11 is molded by known methods from a plastic material that will stand severe weathering and particularly installation in very cold weather. This is essential in some climates because, as shall be shown, the clamp 11 undergoes flexing when a wire is installed in it. I have found that nylon such as that sold under the trademark Zytel by E. I. du Pont de Nemoirs & Co. Inc. and acrylonitrile butadiene styrene polymer available from a number of suppliers as ABS are suitable for the clamp 11 if they are compounded for outdoor use with antiactinic agents and, preferably carbon black filler, in the known manner. By making the clamp 11 of molded plastic and particularly of high-strength plastic, such as those I have mentioned, I am enabled to keep it compact and inexpensive and still incorporate the several advantageous features that shall be described.

The clamp 11 comprises two plate-like leg members 12, 13 having respective thin portions 14, 15 and thick portions 16, 17. The thick portions 16, 17 are joined by an integral bridge 18 that is sufficiently long to give it adequate area to hold the legs 12, 13 together under considerable stress. In the illustrated case this length is 3/16 inch and I believe a length of the bridge portion of at least 1/8 inch to be necessary. The portions 14, 15 define a channel 19 for a drop wire 21 which is of parallel wire construction. This type of insulated wire is built to resist abrasion and weathering and has a tough, hard surface that has proven hard to hold permanently without employing metal clamps and wedge members. It will be understood, however, that clamps, such as that presently described, made from insulating material are much to be preferred. The dimensions of the channel 19 are chosen to fit closely to the wire 21 but it will be understood that my invention is not limited in its application to wires of oval shape but will also have utility for single-conductor wires of circular section. Molded into the thin portions 14, 15 are lips 22, 23 curved inwardly so that the wire 21 will push the lips apart and snap into the channel 19. Spreading of the lips 22, 23 is facilitated by a slot 24 extending from the bridge 18 and opening into or coextensive with the channel 19 at the section 26. The clamping action of the lips 22, 23 is sufficient to hold the weight of a considerable length of the wire 21 without opening, and this feature is useful during the process of installation for supporting the wire before it is locked in place.

A bore 27 is defined by circular walls through the thick portions 16, 17 to accommodate a screw 28 such as the wood screw in the illustrated case. In other embodiments, however, my support may comprise a sheet metal screw, toggle bolt, expansion anchor, nail or other fastening means depending, largely, on the nature of the surface to which the support will be attached. The screw 28 is factory assembled to the clamp 11 and is frictionally retained in the clamp during storage and delivery by means of a membrane or web 29 molded with and integral to the remainder of the clamp 11. The screw 28 may be inserted into either end of the bore 27 and this, of course, affords economies in assembly since the clamps do not have to be oriented in position. For this reason the legs 12, 13 are identical, but any difference in these legs, so long as they are equivalent and either one can face outwardly during installation, will come within the scope of my invention. The legs 12 and 13 are made as thin as possible, consistent with strength requirements, for the purpose of economizing on material, speeding the molding process, and reducing the shipping weight. I have found that by adding stiffening walls 31–34 to each of the legs 12, 13, I can obtain the required stiffness and strength while reducing the thickness of the legs to a minimum. The walls 31–34 also provide protection for the head of the screw 28. Two lengthwise ridges 36, 37 are raised from each of the leg surfaces tangent to the bore 27. These serve to support the head of the screw 28 and to prevent the screw head from cutting into the structural portions of the clamp.

A plurality of gripping ridges 38 project inwardly from the walls of the channel 19 to prevent lengthwise movement of the hard-surfaced wire 21 after the screw 28 has been finally tightened and the clamp 11 is made wide enough to provide an adequate gripping surface.

I have invented a new and useful wire support of which the foregoing description has been exemplary rather than definitive and for which I desire an award of Letters Patent as defined in the following claims.

I claim:
1. A drop-wire support comprising:
   (A) an integral polymeric clamping member comprising
      (a) a pair of equivalent facing plate-like leg members,
      (b) said leg members having thin-walled portions cooperating to define a channel closely fitting said drop wire,
      (c) said leg members having solid thick-walled portions cooperating to define a narrow slot, coextensive with said channel,
      (d) bridging means integral with said thick-walled portions joining said leg members at one end thereof, said slot extending from said bridging means to said channel,
      (e) inwardly facing lips forming an end of said channel opposite said slot, said lips defining a lengthwise entrance to said channel narrower than said drop wire,
      (f) a plurality of gripping ridges projecting inwardly of said channel from said leg members across the lengthwise dimension of said drop wire,
      (g) stiffening walls projecting outwardly around the edges of said clamping member, and
      (h) walls through said thick-walled portions of said leg members, defining a bore, and
   (B) elongated fastening means projecting through said bore.
      (a) said fastening means having a length sufficient to attach said clamping member to a supporting surface, and
      (b) said fastening means compressing said slot and tightening said clamping member around said drop wire, thereby impressing said gripping ridges into the surface of said drop wire and securing said drop wire against lengthwise movement through said support,
said drop-wire having a snap fit laterally into said clamping member by spreading said slot, without removing said fastening means, prior to tightening said fastening means, and being securely locked in said clamping member upon said fastening means being tightened.

2. The support of claim 1 wherein said clamping member comprises nylon.

3. The support of claim 1 wherein said clamping member comprises acrylonitrile butadiene styrene polymer.

4. The supports of any one of claims 1, 2, and 3 comprising at least one integral membrane across said bore penetrable by said fastening means and frictionally retaining said fastening means within said bore.

References Cited

UNITED STATES PATENTS

| | | | |
|---|---|---|---|
| 1,490,489 | 4/1924 | Seavey | 287—14 |
| 2,935,553 | 5/1960 | Showman | 174—157 |
| 3,241,797 | 3/1966 | Anderson | 248—71 |

FOREIGN PATENTS

| | | |
|---|---|---|
| 302,509 | 12/1963 | Netherlands. |

CHANCELLOR E. HARRIS, Primary Examiner

U.S. Cl. X.R.

24—73; 174—; 248—74

PO-1050
(5/69)

UNITED STATES PATENT OFFICE
CERTIFICATE OF CORRECTION

Patent No. 3,498,575      Dated March 3, 1970

Inventor(s) Billy C. Downing

It is certified that error appears in the above-identified patent and that said Letters Patent are hereby corrected as shown below:

column 2, line 15, for "our" read --my-- column 4, line 13, change the period to a comma

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents